(12) United States Patent
Schramm et al.

(10) Patent No.: US 11,366,911 B2
(45) Date of Patent: Jun. 21, 2022

(54) CRYPTOGRAPHY MODULE AND METHOD FOR OPERATING SAME

(71) Applicant: Robert Bosch GmbH, Stuttgart (DE)

(72) Inventors: Juergen Schramm, Bietigheim-Bissingen (DE); Alexander Meurer, Bochum (DE); Ramona Jung, Stuttgart (DE); Christoph Lenz, Backnang (DE); Andreas Weber, Weissach (DE); Florian Ziegler, Stuttgart (DE); Frederic Stumpf, Leonberg (DE); Ilias Sagar, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/052,242

(22) PCT Filed: May 22, 2019

(86) PCT No.: PCT/EP2019/063187
§ 371 (c)(1),
(2) Date: Nov. 2, 2020

(87) PCT Pub. No.: WO2019/242970
PCT Pub. Date: Dec. 26, 2019

(65) Prior Publication Data
US 2021/0374230 A1      Dec. 2, 2021

(30) Foreign Application Priority Data

Jun. 20, 2018 (DE) .......................... 102018209965.0
Jul. 13, 2018 (DE) .......................... 102018211752.7
Aug. 13, 2018 (DE) .......................... 102018213616.5

(51) Int. Cl.
*G06F 21/00*     (2013.01)
*G06F 21/60*     (2013.01)
(Continued)

(52) U.S. Cl.
CPC .......... *G06F 21/602* (2013.01); *G06F 9/4401* (2013.01); *G06F 12/1408* (2013.01);
(Continued)

(58) Field of Classification Search
None
See application file for complete search history.

(56) References Cited

U.S. PATENT DOCUMENTS

2005/0193217 A1    9/2005    Case et al.
2009/0327678 A1    12/2009   Dutton et al.
(Continued)

FOREIGN PATENT DOCUMENTS

DE    102009046436 A1    5/2011

OTHER PUBLICATIONS

International Search Report for PCT/EP2019/063187, dated Jul. 19, 2019.

(Continued)

*Primary Examiner* — Andrew J Steinle
(74) *Attorney, Agent, or Firm* — Norton Rose Fulbright US LLP; Gerard Messina

(57) ABSTRACT

A cryptography module for at least temporarily controlling an operation of at least one computing device. The cryptography module is designed to check at least one memory area of a memory unit capable of being accessed by the computing device, and to control the operation of the at least one computing device as a function of the check. The cryptography module is designed to receive a first control command from the computing device, which characterizes at least one memory area of the memory unit to be checked, and to check the memory area characterized by the first control command.

17 Claims, 3 Drawing Sheets

(51) Int. Cl.
  *G06F 12/14* (2006.01)
  *G06F 21/57* (2013.01)
  *G06F 21/64* (2013.01)
  *G06F 21/79* (2013.01)
  *H04L 9/32* (2006.01)
  *G06F 9/4401* (2018.01)
  *G06F 21/51* (2013.01)
  *G06F 21/56* (2013.01)

(52) U.S. Cl.
  CPC ............ *G06F 21/51* (2013.01); *G06F 21/567* (2013.01); *G06F 21/57* (2013.01); *G06F 21/575* (2013.01); *G06F 21/64* (2013.01); *G06F 21/79* (2013.01); *H04L 9/3242* (2013.01); *G06F 2212/1052* (2013.01); *G06F 2221/03* (2013.01)

(56) References Cited

U.S. PATENT DOCUMENTS

| | | | |
|---|---|---|---|
| 2013/0117578 A1* | 5/2013 | Ihle | H04L 9/32 713/193 |
| 2014/0068766 A1* | 3/2014 | Klustaitis | G06F 21/57 726/23 |
| 2018/0150637 A1* | 5/2018 | Filimon | G06F 21/575 |

OTHER PUBLICATIONS

Morris Dworkin, "Recommendation for Block Cipher Modes of Operation: The CMAC Mode for Authentication," NIST Special Publication 800-38B, Computer Security Division Information Technology Laboratory, 2005, pp. 1-21. <https://doi.org/10.6028%2fnist.sp.800-38b>.

* cited by examiner

CRYPTOGRAPHY MODULE AND METHOD FOR OPERATING SAME

FIELD

The present invention relates to a cryptography module. The present invention further relates to a method for operating such a cryptography module.

BACKGROUND INFORMATION

A cryptographic hardware module is described in German Patent Application No. DE 10 2009 046436 A1.

SUMMARY

An object of the present invention is to provide a cryptography module including enhanced functional product value.

The object may be achieved with a cryptography module in accordance with example embodiments of the present invention. In accordance with an example embodiment of the present invention, the cryptography module is designed to at least temporarily control an operation of a least one computing device, the cryptography module being designed to check at least one memory area of a memory unit capable of being accessed by the computing device, and to control the operation of the at least one computing device as a function of the check, the cryptography unit being designed to receive a first control command from the computing device, which characterizes at least one memory area of the memory unit to be checked and to check the memory area characterized by the first control command. This advantageously provides the possibility of checking a content of the memory area, for example, for deviations with respect to a predefinable content. In this way, it is possible to advantageously prevent, for example, computer programs that are unsecured or compromised by an attacker from being executed by the computing device. The memory area to be checked or the memory areas to be checked may further advantageously be signaled to the cryptography module with the aid of the first control command (for example, pieces of address information as to which memory blocks are to be checked), so that, for example, these pieces of information do not have to be pre-configured. Instead, the memory area to be checked or the memory areas to be checked may be dynamically signaled (for example, during the runtime of the cryptography module or the computing device) with the aid of the first control command, as a result of which the flexibility is further enhanced.

In preferred specific embodiments of the present invention, the memory unit may be situated externally relative to the cryptography module and to the computing device. In further preferred specific embodiments, the memory unit may, however, also be integrated into the computing device. In still further preferred specific embodiments of the present invention, a system-on-a-chip (SoC) may advantageously also be provided, which includes the computing device, the memory unit and at least one cryptography module according to the specific embodiments.

In further preferred specific embodiments of the present invention, the computing device may include at least one processor core and/or one microprocessor and/or one microcontroller or the like.

In further preferred specific embodiments of the present invention, it is provided that the cryptography module is designed to carry out the check of the at least one memory area using a key-based message authentication code (CMAC). This enables a particularly efficient check. An Internet publication relating to an exemplary design of the CMAC method is retrievable, for example, at https://doi.org/10.6028%2Fnist.sp.800-38b.

In further preferred specific embodiments, it is provided that the cryptography module includes a memory unit preferably integrated into the cryptography module for storing at least one reference value and/or a reference layout for the at least one memory area. In further preferred specific embodiments of the present invention, the reference value may represent, for example a CMAC value for a predefinable memory content, which may be compared, for example, to a CMAC value that has been ascertained by the cryptography module during the check of the at least one memory area. If the ascertained CMAC value deviates from the reference value, an inadmissible change of the memory content of the checked memory area may then be deduced.

In further preferred specific embodiments of the present invention, it is provided that the cryptography module is designed to carry out the check as a function of the reference value. In these specific embodiments, the check encompasses, for example, the formation of a CMAC value as a function of the memory content of the at least one memory area and a comparison of the CMAC value thus formed with the reference value, as it is stored, for example, in the memory unit of the cryptography module. Alternatively or in addition, in further preferred specific embodiments of the present invention, the reference value may also be transmitted to the cryptography module with the aid of the first control command. Further alternatively or in addition, in further specific embodiments, multiple reference values for multiple memory areas to be checked may also be transmitted to the cryptography module with the aid of the first control command.

In further preferred specific embodiments of the present invention, the reference layout may contain one or multiple of the following pieces of information: a) number of memory areas in the memory unit capable of being accessed by the computing device, b) address area (start address and/or end address) of the relevant memory areas, c) length of the relevant memory areas, d) at least one reference value (for example, a CMAC value) of the relevant memory area, e) data relating to a cryptographic signature, for example, a signature address and/or a signature type and/or a reference to a root certificate. The pieces of information may be stored preferably in a data structure including multiple corresponding data fields.

In further preferred specific embodiments of the present invention, the cryptography module may utilize the aforementioned reference values or the reference layout, in order to establish the type and scope of a check of at least one memory area. For example, the set of input data for the check (for example, CMAC value formation) may be established based on a start address and end address.

In further preferred specific embodiments of the present invention, it is provided that the cryptography module is designed to hold the computing device in a reset state, the cryptography module being designed, in particular, to hold the computing device in the reset state until the check is completed. This prevents the computing device from executing a computer program corresponding to the memory area to be checked as long as the check has not already been completed. While the computing device is held in the reset state, it is unable to execute any computer program. A timing may also be advantageously provided for an initialization of a system that includes the cryptography module and the computing device in such a way that the cryptography module is initially activated, and that the cryptography module shifts the computing device into the reset state immediately after its activation, in order to prevent potentially not already checked software from one memory area from being executed by the computing device.

In further preferred specific embodiments of the present invention, it is provided that the cryptography module is designed to establish within the scope of the check whether a content of the at least one memory area corresponds to a predefinable memory content, and to end the reset state for the computing device if the check has indicated that the content of the at least one memory area corresponds to the predefinable memory content. It may then be assumed that the content of the at least one memory area is proper, i.e., in particular, is not manipulated.

In further preferred specific embodiments of the present invention, it is provided that the cryptography module is designed to continue to hold the computing device in the reset state when the check has indicated that the content of the at least one memory area does not correspond to the predefinable memory content. The check whether a content of the at least one memory area corresponds to a predefinable memory content may in turn be carried out in further preferred specific embodiments by forming a CMAC value as a function of the actual memory content and by comparing the CMAC value thus obtained with a reference CMAC value.

In further preferred specific embodiments of the present invention, it is provided that the at least one memory area includes at least one computer program provided for execution on the computing device, in particular, a bootloader or bootmanager, for the computing device. In this way, the bootloader may advantageously already be checked by the cryptography module, i.e., the computer program for the computing device which, in general, is executed as the first program and, for example, controls which (further) computer programs are started or executed by the computing device during an initialization of the computing device. This advantageously ensures that immediately after an initialization of the computing device only computer programs checked beforehand by the cryptography module are executed by the computing device or at least the bootloader is not manipulated.

In further preferred specific embodiments of the present invention, the previously described check may also be carried out for memory contents or computer programs other than the aforementioned bootloader, for example, on such computer programs intended to be executed after the start process (booting) of the computing device. This yields corresponding advantages for the further operation of the computing device. This may, in particular, prevent compromised computer programs from being executed by the computing device. As a result, it may be particularly advantageously also ensured that, for example, a communication to be cryptographically safeguarded, which the computing device is to execute, for example, for exchanging data with other components, may not be compromised at the outset (for example, from the system start), for example, by implanting manipulated computer programs, which misuse (secret) cryptographic keys to be potentially processed or transmit them to unauthorized receivers. Which further memory contents or computer programs are to be checked by the cryptography module may be advantageously, in particular, dynamically, signaled by the computing device to the cryptography module in further advantageous specific embodiments with the aid of the first control command (and/or with the aid of further control commands comparable to the first control command).

In further preferred specific embodiments of the present invention, it is provided that the cryptography module is designed to provide first data, in particular, cryptographic keys to the computing device, the cryptography module being designed, in particular, to provide the first data to the computing device only partially or not at all as a function of the check. If, for example, it has been established within the scope of the above-described check that the content of a checked memory area corresponds to the predefinable values (for example, by comparing corresponding CMAC values), it may be deduced that an un-manipulated original software is present, and the computing device may be permitted the access to the first data, in particular, cryptographic keys, stored in the cryptography module. If, however, the above-described check indicates that the content of the checked memory area does not correspond to the predefinable values, i.e., the checked software has been potentially manipulated, it may be provided that the cryptography module completely blocks the access of the computing device to cryptographic keys or other first data stored in the cryptography module or providable by the cryptography module, as a result of which the computing device may be advantageously prevented from removing cryptographic keys from the cryptography module by controlling a manipulated software. In further preferred specific embodiments, it is also possible that an access to a first subset of cryptographic keys stored in the cryptography module is made available to the computing device as a function of the type of the checked memory content, but not an access to a second subset of cryptographic keys.

In further preferred specific embodiments of the present invention, it is provided that the cryptography module is designed at least partially, in particular completely, as a hardware circuit. In further specific embodiments, it may be provided that the cryptography module includes at least one processor core and/or one working memory (RAM) and/or one non-volatile memory (for example, Flash EEPROM) and/or at least one cryptography unit, designed preferably at least partially, further preferably completely, as a hardware circuit, which is designed, for example, to carry out the CMAC calculations and/or comparisons of multiple CMAC values (for example, ascertained CMAC value for one particular memory area/reference CMAC value).

In further preferred specific embodiments of the present invention, it is provided that the cryptography module is designed to check a bootloader of the computing device (for example, with the aid of a CMAC calculation) to unblock an execution of the bootloader after the successful check of the bootloader (for example, by releasing the computing device from the reset state), and, preferably in particular after the unblocking of the bootloader, to wait for the first control command, which is outputtable, for example, while controlling the bootloader. This advantageously ensures that both the bootloader of the computing device, as well as one or multiple other computer programs for the computing device may be checked following the principle of the specific embodiment (in particular, without a first control command from the not already actively operating computing device having to be required for this purpose), the computing device itself being able to advantageously establish after the successful check of its bootloader with the aid of the first control command, which (further) memory areas or computer programs (in addition to the already checked bootloader) are to be checked by the cryptography module.

Further preferred specific embodiments of the present invention include a method for operating a cryptography module for at least temporarily controlling an operation of at least one computing device. In accordance with an example embodiment of the present invention, the cryptography module checks at least one memory area of a memory unit capable of being accessed by the computing device, and controls the operation of the at least one computing device as a function of the check, the cryptography module receiving a first control command from the computing device, which characterizes at least one memory area of the memory unit to be checked, and checking the memory area characterized by the first control command.

Further preferred specific embodiments of the present invention include a computing device that includes at least one or for at least one cryptography module according to the specific embodiments of the present invention. In accordance with an example embodiment of the present invention, the computing device is designed to transmit a first control command to the at least one cryptography module, the first control command characterizing at least one memory area of the memory unit to be checked. As a result, the computing device is able to advantageously communicate, in particular, dynamically, to the cryptography module, which memory area or which memory areas within the context of the principle of the specific embodiments are to be checked by the cryptography module.

In further preferred specific embodiments of the present invention, it is provided that the computing device is designed to receive a second control command from the at least one cryptography module, the second control command signaling a successful check of the memory area of the memory unit to be checked, the computing device, in particular, being designed, after receiving the second command, to execute at least one computer program that is associated with the memory area to be checked, which is situated, in particular, at least partially, preferably completely, in the memory area to be checked.

Further preferred specific embodiments of the present invention relate to a SoC that includes a computing device and at least one cryptography module according to the specific embodiments.

Further advantageous specific embodiments of the present invention are described herein.

BRIEF DESCRIPTION OF THE DRAWINGS

Further features, potential applications and advantages of the present invention result from the following description of exemplary embodiments of the present invention, which are depicted in the figures. All described or depicted features in this case form alone or in arbitrary combination the subject matter of the present invention, regardless of their combination or their wording or depiction in the description or in the figures.

DETAILED DESCRIPTION OF EXAMPLE EMBODIMENTS

Figure 1:
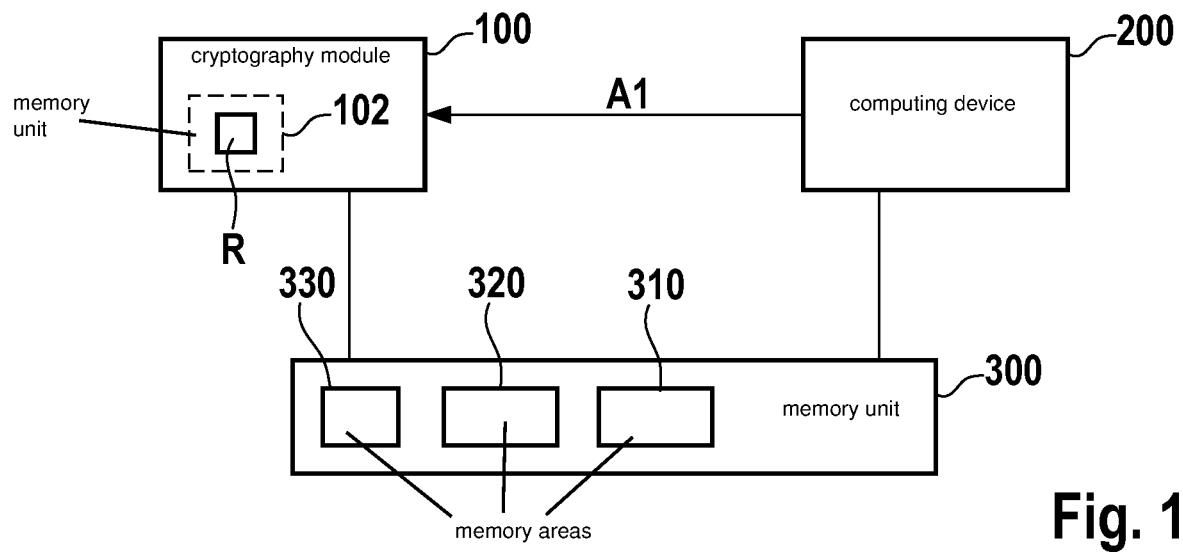
FIG. 1 schematically shows a simplified block diagram of a cryptography module according to one specific embodiment of the present invention.

FIG. 1 schematically shows a simplified block diagram of a cryptography module 100 according to one specific embodiment of the present invention. Cryptography module 100 is provided for at least temporarily controlling an operation of at least one computing device 200. Cryptography module 100 is designed, in particular, to check at least one memory area 310, 320, 330 of a memory unit 300 capable of being accessed by computing device 200, and to control the operation of the at least one computing device 200 as a function of the check, cryptography module 100 being designed, in particular, to receive a first control command A1 from computing device 200, which characterizes at least one memory area 310 of memory unit 300 to be checked, and to check the memory area characterized by first control command A1. This advantageously provides the possibility of checking a content of the memory area, for example, for deviations with respect to a predefinable content. In this way, it is advantageously possible to prevent the execution of computer programs by computing device 200, which are unsecured or compromised by an attacker. Memory area 310 to be checked or memory areas 310, 320, 330 to be checked may further advantageously be signaled to cryptography module 100 with the aid of first control command A1 (for example, pieces of address information, which indicate which memory blocks are to be checked), so that, for example, these pieces of information do not have to be pre-configured. Instead, the memory area to be checked or the memory areas to be checked may be dynamically signaled (for example, during the runtime of cryptography module 100) with the aid of first control command A1, as a result of which the flexibility is further enhanced.

In preferred specific embodiments of the present invention, memory unit 300 as depicted by way of example in FIG. 1 may be situated externally relative to cryptography module 100 and to computing device 200.

In further preferred specific embodiments of the present invention, it is provided that cryptography module 100 is designed to carry out the check of the at least one memory area 310, 320, 330 using a key-based message authentication code (CMAC). This enables a particularly efficient check. An Internet publication relating to an exemplary design of the CMAC method is retrievable, for example, at https://doi.org/10.6028%2Fnist.sp.800-38b. ("NIST Special Publication 800-38B Recommendation for Block Cipher Modes of Operation: The CMAC Mode for Authentication").

In further preferred specific embodiments of the present invention, it is provided that cryptography module 100 includes an optional memory unit 102, preferably integrated into cryptography module 100, for storing at least one reference value R and/or one reference layout for the at least one memory area 310, 320, 330 (or, in further specific embodiments, for entire memory unit 300). Computing device 200, or some other component that differs from cryptography module 100, is preferably unable to access memory unit 102.

In further preferred specific embodiments of the present invention, reference value R may, for example, represent a CMAC value for a predefinable memory content, which is comparable, for example, with a CMAC value that has been ascertained by cryptography module 100 during the check of the at least one memory area 310, 320, 330. If the ascertained CMAC value deviates from reference value R, then an inadmissible change of the memory content of the checked memory area 310, 320, 330 may be deduced.

In other words, it is provided in preferred specific embodiments that cryptography module 100 is designed to carry out the check as a function of reference value R. In these specific embodiments, the check encompasses, for example, the formation of a CMAC value as a function of the memory content of the at least one memory area 310, 320, 330, and a comparison of the CMAC value thus formed with reference value R, as it is stored, for example, in memory unit 102 of cryptography module 100. A corresponding reference value, for example, a CMAC value, may be advantageously stored in memory unit 102 of cryptography module 100 for each memory area 310, 320, 330 to be checked.

In further preferred specific embodiments of the present invention, the reference layout, which may also be stored in memory unit 102 of cryptography module 100, may contain one or multiple of the following pieces of information: a) number of memory areas 310, 320, 330 in memory unit 300 capable of being accessed by computing device 200, b) address area of the relevant memory areas 310, 320, 330, c) length of the relevant memory areas 310, 320, 330, d) at least one reference value (for example, a CMAC value) of the relevant memory area 310, 320, 330, e) data relating to a cryptographic signature, for example, a signature address and/or a signature type and/or a signature reference to a root certificate. In further specific embodiments, the reference layout further preferably encompasses at least some of the aforementioned data (for example, reference value and memory area) for a bootloader of computing device 200, so that cryptography module 100 is even able to check the bootloader of computing device 200.

In further preferred specific embodiments of the present invention, cryptography module 100 may utilize abovementioned reference value R or the reference layout in order to establish the type and the scope of a check of at least one memory area 310, 320, 330.

Alternatively or in addition, reference value R or the reference layout (or further pieces of control information that characterize reference value R and/or the reference layout) in further preferred specific embodiments may be transmitted to the cryptography module with the aid of first control command A1. This may take place in further specific embodiments, for example, while controlling the bootloader. In further specific embodiments, it is therefore also possible—at least for some memory areas to be potentially checked—to omit a storing of reference value R or of the reference layout in cryptography module 100, in particular, beyond a temporary intermediate storage.

Figure 2:
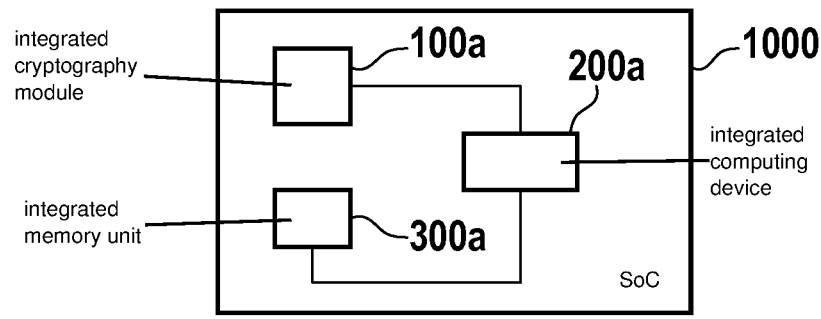
FIG. 2 schematically shows a simplified block diagram of a cryptography module according to one further specific embodiment of the present invention.

FIG. 2 schematically shows a simplified block diagram of a further specific embodiment of the present invention. A system-on-a-chip (SoC) 1000 is depicted, including an integrated computing device 200a and an integrated cryptography module 100a, which includes, for example, the functionality described above with reference to FIG. 1. System-on-a-chip 1000 further includes an integrated memory unit 300a capable of being accessed by computing device 200a. Computer programs or modules provided for execution by processing device 200a are stored, in particular, in corresponding memory areas (not shown) of memory unit 300a and are checkable by integrated cryptography module 100a according to the specific embodiments.

Figure 3:
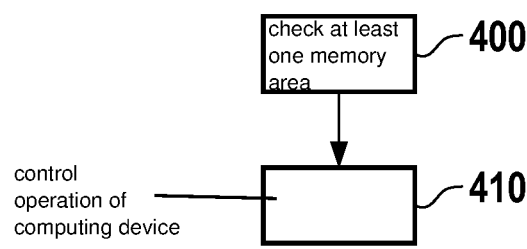
FIG. 3 schematically shows a simplified flowchart of a method according to one specific embodiment of the present invention.

FIG. 3 shows a simplified flowchart of a method according to one specific embodiment of the present invention. In step 400, cryptography module 100 (FIG. 1) checks at least one memory area 310, 320, 330 of memory unit 300, and in subsequent step 410, cryptography module 100 controls the operation of computing device 200 as a function of check 400.

In further preferred specific embodiments of the present invention, it is provided that cryptography module 100 (FIG. 1) is designed to hold computing device 200 in a reset state, cryptography module 100 being designed, in particular, to hold computing device 200 in the reset state until the check is completed. This prevents computing device 200 from executing a computer program corresponding to memory area 310, 320, 330 to be checked as long as the check has not already been completed. Computing device 200 is unable to execute any computer program while it is held in the reset state.

In further preferred specific embodiments of the present invention, it is provided that cryptography module 100 is designed to establish within the scope of the check whether a content of the at least one memory area 310, 320, 330 corresponds to a predefinable memory content, and to end the reset state for computing device 200 if the check has indicated that the content of the at least one memory area corresponds to the predefinable memory content.

Cryptography module 100 is in particular preferably designed to continue to hold computing device 200 in the reset state when the check has indicated that the content of the at least one memory area does not correspond to the predefinable memory content. The check whether a content of the at least one memory area corresponds to a predefinable memory content may be carried out in further preferred specific embodiments by in turn forming a CMAC value as a function of the actual memory content and by comparing the CMAC value thus obtained with a reference CMAC value.

In further preferred specific embodiments of the present invention, it is provided that the at least one memory area includes at least one computer program provided for execution on the computing device, in particular, a bootloader for the computing device. In this way, it is possible to advantageously already check the bootloader, i.e., the computer program for the computing device, by the cryptography module 100, which, during an initialization of the computing device 200, is executed as the first program. This advantageously ensures that, immediately after an initialization of the computing device, only computer programs checked beforehand by the cryptography module are executed by the computing device.

In further preferred specific embodiments of the present invention, the above-described check may also be carried out for memory contents or computer programs other than the aforementioned bootloader, for example, on such computer programs, which are intended to be executed after the start process (booting) of the computing device. This yields corresponding advantages for the further operation of the computing device. This may, in particular, prevent compromised computer programs from being executed by the computing device.

In further preferred specific embodiments of the present invention, it is provided that cryptography module 100 is designed to provide computing device 200 with first data, in particular, cryptographic keys, cryptography module 100 being designed, in particular, to provide computing device 200 only partially or not at all with the first data as a function of check 400 (FIG. 3). If, for example, it has been established within the scope of above-described check 400 that the content of a checked memory area 310 (FIG. 1) corresponds to the predefinable values (for example, by comparing corresponding CMAC values), it may be deduced that an un-manipulated original software is present and computing device 200 may be permitted access to the first data, in particular, cryptographic keys, stored in cryptography module 100. Computing device 200 may use the cryptographic keys obtained from the cryptography module, for example, to cryptographically safeguard a communication with other units, for example, other computing units (not shown), for example, by encrypting the messages and/or by forming CMAC values for the messages.

If, however, the above-described check indicates that the content of the checked memory area does not correspond to the predefinable values, i.e., has potentially been manipulated, it may be provided that cryptography module 100 completely blocks the access of computing device 200 to cryptographic keys or other first data stored in the cryptography module or providable by the cryptography module, as a result of which the computing device may be advantageously prevented from removing cryptographic keys from the cryptography module by controlling a manipulated software. In further preferred specific embodiments, it is also possible that, as a function of the type of checked memory content of the computing device (for example, bootloader or regular software, which is intended to be executed only after the execution of the bootloader), an access to a first subset of cryptographic keys stored in the cryptography module is unblocked, but not an access to a second subset of cryptographic keys.

Figure 4:
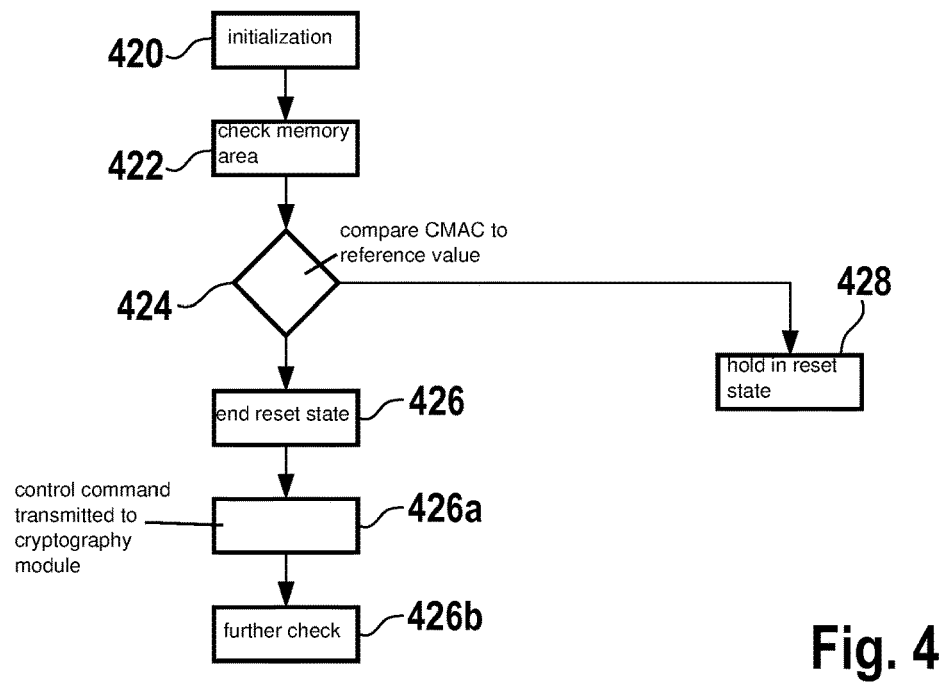
FIG. 4 schematically shows a simplified flowchart of a method according to one further specific embodiment of the present invention.

FIG. 4 shows a simplified flowchart of a method according to one further specific embodiment of the present invention. In step 420, an initialization of cryptography module 100 (FIG. 1) takes place. In this case, for example, a reference layout optionally stored in memory unit 102 or parts thereof and/or configuration data for cryptography module 100 may be read and evaluated. Computing device 200 may optionally also be shifted into its reset state in step 420 and held in the reset state for the time being. In step 422 (FIG. 4), at least one memory area 310 (FIG. 1) of memory unit 300 is then checked, in which, for example, a bootloader program for computing device 200 is stored. The checking from step 422 involves, for example, the formation of a CMAC value for the bootloader program. The CMAC value ascertained in this case is then compared in step 424 with a reference value previously ascertained and stored for the bootloader, which is downloadable, for example, by cryptography module 100 from memory unit 102.

If comparison 424 indicates that the CMAC value for the bootloader program stored instantaneously in memory area 310 formed during the checking in step 422 coincides with the CMAC reference value previously ascertained (for example, during the production of cryptography module 100 and/or with a parameterization of cryptography module 100 in a cryptographically secure environment), and stored in memory unit 102, cryptography module 100 may end the reset state of computing device 200, cf. step 426, upon which computing device 200 assumes its regular operation and is able to execute the bootloader program from memory area 310.

If, however, comparison 424 indicates that the CMAC value for the bootloader program stored instantaneously in memory area 310 formed during the checking in step 422 does not coincide with the CMAC reference value previously ascertained, a branching occurs in step 428, in which computing device 200 continues to be held by cryptography module 100 in its reset state in order to prevent computing device 200 from executing the potentially compromised bootloader.

In step 426, the access of computing device 200 to one or multiple cryptographic keys providable by cryptography module 100 may optionally also be unblocked.

The computing device may further optionally transmit first control command A1 (FIG. 1) after step 426 to cryptography module 100, cf. step 426a (FIG. 4), for example, in order to indicate to cryptography module 100 which memory area or which computer program is to be checked next by cryptography module 100. The corresponding (further) check by cryptography module 100 may then optionally also take place as a function of first control command A1, cf. step 426b.

Figure 5:
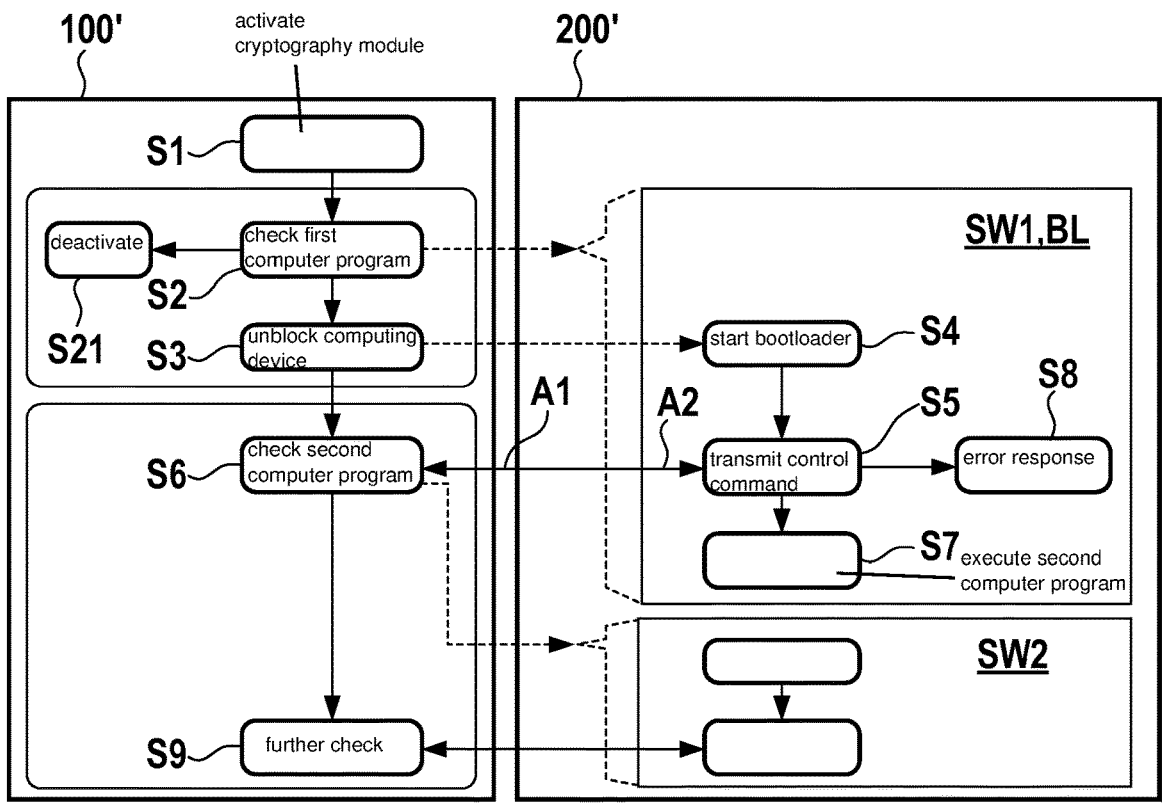
FIG. 5 schematically shows a simplified block diagram of one further specific embodiment of the present invention.

FIG. 5 schematically shows a simplified block diagram of a further specific embodiment of the present invention. Area 100' encompasses steps carried out essentially by computing device 100, and area 200' encompasses steps carried out essentially by computing device 200. In step S1, cryptography module 100 is activated. Immediately after its activation, cryptography module 100 holds computing device 200 in its reset state. In step S2, cryptography module 100 checks a first computer program SW1 for computing device 200. First computer program SW1 may, for example, preferably be a bootloader BL for computing device 200. The checking in step S2 encompasses, for example, the formation of a CMAC value as a function of first computer program SW1 or of a corresponding memory content of a memory unit storing first computer program SW1, and a comparison with a reference CMAC value. The pieces of information as to which memory area is to be checked, and which (for example, CMAC) reference value is to be utilized for this purpose, may be derived by the cryptography module, for example, from the reference data stored in memory unit 102.

If check S2 indicates no match of the two CMAC values, it is deduced that first computer program SW1 is manipulated or defective, and a branching occurs in step S21, in which computing device 200 is deactivated, for example. If check S2 indicates a match of the two CMAC values, it may be deduced that first computer program SW1 is intact and may be executed by computing device 200. In this case, a branching occurs from step S2 in step S3, in which computing device 200 is unblocked, i.e., released from the effected or previously maintained reset state. Computing device 200 may then execute first computer program SW1, thus in the present case, start the bootloader, cf. step S4.

In further preferred specific embodiments of the present invention, computing device 200, for example, while controlling bootloader SW1, may transmit first control command A1 previously described above with reference to FIG. 1 to cryptography module 100, cf. step S5, first control command A1 characterizing at least one (further) memory area of memory unit 300 to be checked or a corresponding computer program SW2, for example, indicating the relevant addresses in the memory unit or an address area.

In the present case, it is assumed, for example, that in a second memory area 320 of a memory unit, a second computer program SW2 is provided for computing device 200, which is to involve the next check by cryptography module 100. Accordingly, computing device 200 transmits aforementioned first control command A1 to cryptography module 100, and cryptography module 100 carries out a check of second computer program SW2 in step S6. The check according to step S6 may take place preferably similarly to the check according to step S2. A corresponding CMAC reference value for second computer program SW2 may in turn be read out from internal memory unit 102 by cryptography module 100. Alternatively or in addition, the corresponding CMAC reference value for second computer program SW2 may also be transmitted with the aid of first control command A1 from bootloader BL to the cryptography module.

If the check according to step S6 has indicated that second computer program SW2 is intact, cryptography module 100 may signal this to computing device 200 with the aid of a second control command A2. Upon receiving second control command A2, computing device 200 transitions accordingly to next step S7, which involves, for example, the execution of second computer program SW2. If, however, the check according to step S6 has indicated that second computer program SW2 is not intact, cryptography module 100 communicates this to computing device 200 also with the aid of control command A2 (alternatively, the transmission of second control command A2 may be omitted, and after the expiration of a predefinable waiting period without receiving second control command A2 from the cryptography module, computing device 200 may deduce that the check was unsuccessful). In this case, computing device 200 transitions into step S8 after receiving second control command A2 (or after a passage of time without receiving second control command A2), which results in the introduction of an error response. The error response according to step S8 may, for example, involve a deactivation or deletion of second computer program SW2.

In further preferred specific embodiments of the present invention, the method may be continued by checking further computer programs or corresponding memory areas with the aid of cryptography module 100, cf. step S9.

In further preferred specific embodiments of the present invention, cryptography module 100 may keep a record or log file relating to successful and/or unsuccessful checks. Cryptography module 100 may, for example, store an error entry if a check of a memory area 310, 320, 330 or of a software contained therein has failed (for example, identified by a deviation of the ascertained CMAC value from the reference CMAC value). In further specific embodiments, the record or log file or parts thereof may be evaluated during a subsequent start of the cryptography module and/or of the computing device, and a further operation of computing device 200 may be controlled as a function of this evaluation. In some specific embodiments, for example, a fresh booting (execution of bootloader BL) may be prevented if a check has previously failed. Alternatively or in addition, at least one interrupt may be generated and/or computing device 200 is reset.

Figure 6:
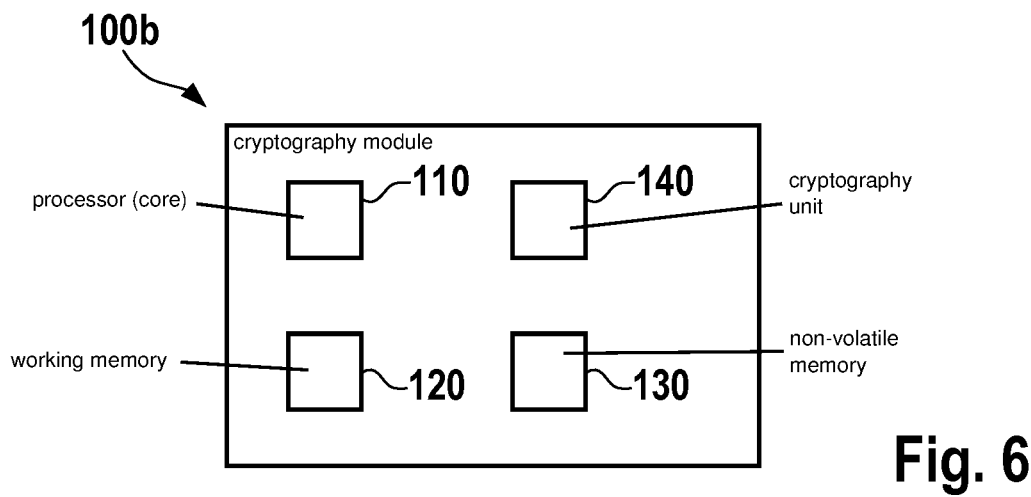
FIG. 6 schematically shows a simplified block diagram of one further specific embodiment of the present invention.

FIG. 6 schematically shows a simplified block diagram of a cryptography module 100b according to one further specific embodiment of the present invention. Cryptography module 100b includes a processor core or processor 110, a working memory 120, a non-volatile memory 130 (for example, Flash EEPROM) and, optionally, a cryptography unit 140, which is designed to carry out one or multiple cryptographic algorithms or at least parts thereof. For example, cryptography unit 140 may be designed to carry out the above-described ascertainment of CMAC values.

The features according to the specific embodiments advantageously enables a targeted check of, for example, computer programs provided for computing device 200 with respect to their authenticity or integrity with the aid of cryptographic methods for example, via the above-described ascertainment of CMAC values and the comparison with reference values. In this way, it is possible to particularly efficiently ascertain whether, for example, a bootloader for computing device 200 is secure, or whether it has been potentially manipulated by an attacker (or whether it has been unintentionally modified due to an error). In this case, the CMAC value calculated as a function of the actual memory area that accommodates the bootloader does not match the reference value known to cryptography module 100.

One further advantage of the features according to the specific embodiments is that a comparatively fine-grain check of computer programs SW1, SW2 for computing device 200 is enabled with respect to their security or authenticity, so that it is possible to check even individual computer programs selectively via the cryptography module. The selective check of a bootloader for computing device 200, for example, particularly advantageously enables a rapid shifting of computing device 200 into a secure bootable state. A potentially also required or desired check of further computer programs SW2 may advantageously take place, advantageously triggered, in particular, dynamically by first control command A1, for example, at least temporarily in parallel to the booting of computing device 200 under the control of bootloader SW1 or at a later point in time. In other words, by applying the principle according to the specific embodiments, the entire memory of memory unit 300 need not always be checked at once, but rather individual memory areas 310, 320, 330 may be flexibly checked by cryptography module 100 at predefinable points in time.

Figure 7:
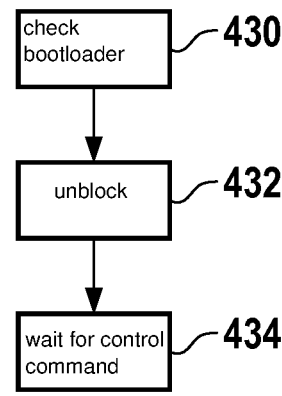
FIG. 7 schematically shows a data structure according to one specific embodiment of the present invention.

FIG. 7 schematically shows a simplified flowchart of a method according to one further specific embodiment of the present invention. In step 430, cryptography module 100 (FIG. 1) checks a bootloader BL (FIG. 5) of computing device 200, for example, with the aid of a CMAC calculation comparable to step S2 according to FIG. 4. After a successful check of bootloader BL, cryptography module 100 unblocks an execution of bootloader BL, cf. step 432, for example, in that a reset state of computing device 200 is no longer maintained by the cryptography module, and in step 434, cryptography module 100 waits for first control command A1, cf. also FIG. 4.

Figure 8:
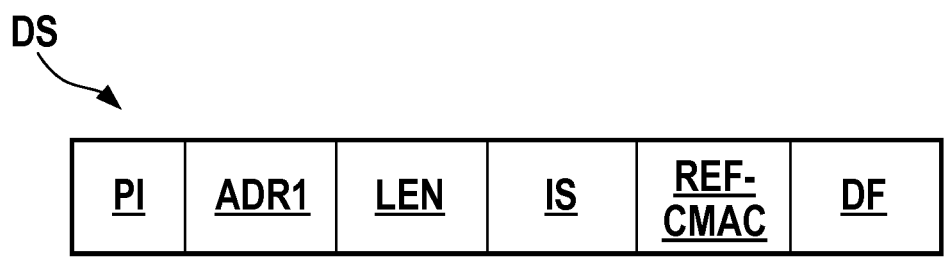
FIG. 8 schematically shows a data structure according to one specific embodiment of the present invention.

FIG. 8 schematically shows a data structure DS according to further preferred specific embodiments of the present invention. Data structure DS may, for example, optionally be used to store CMAC reference values or a reference layout or the like for cryptography module 100, for example, in memory unit 102 of cryptography module 100. In preferred specific embodiments, data structure DS includes a primary index PI, which provides a unique identification. If, for example, multiple data structures or data sets having data structure DS are present, these may be distinguished from one another by utilizing corresponding values for primary index PI. It is possible that in the case of multiple data structures managed by a cryptography module 100 or data sets including mapped data structure DS, a unique value for the aforementioned primary index PI is assigned for each data set.

Data structure DS may further preferably include a start address ADR1, which defines, for example, a memory address, in particular a start address, a memory area 310 in memory unit 300 potentially to be checked (FIG. 1). This may, for example, be a start address in memory unit 300 at which a computer program such as, for example, the above-described bootloader is stored.

Data structure DS further preferably includes a length specification LEN, which indicates the length of the relevant memory area. Data structure DS further preferably includes a status field IS, which specifies an integrity status of the instantaneous data set (for example, "checked" or "erroneous" or the like, which is ascertainable, for example, as a function of the check according to step 400 from FIG. 3). Data structure DS further particularly preferably includes a REF-CMAC field for accommodating a CMAC reference value, as it has been ascertained, for example, at a finishing point in time for a computer program stored in memory unit 300, for example the bootloader. This CMAC reference value may be utilized henceforth by cryptography module 100 for checking the authenticity or integrity of a computer program present in memory unit 300 or in relevant memory area 310 at the point in time of the check.

In further preferred exemplary embodiments of the present invention, data structure DS may also include still further data fields DF, for example, for accommodating signature addresses, signature types and references to corresponding root certificates, and the like.

The principle according to the specific embodiments yields the further advantages cited below: a) it is possible to efficiently detect manipulations (as well as error-related changes) at the content of memory unit 300, for example, manipulations of computer programs stored therein such as, for example, a bootloader or the like, during the runtime of cryptography module 100 ("runtime manipulation detection," RTMD), b) the secure booting (i.e., starting) of a software on computing device 200, for example, of an application software, is ensured ("trusted boot"), c) computer programs SW2 or other data subsequently stored in memory unit 300 may be advantageously also checked according to the principle according to the specific embodiments ("secure flashing"), d) an access to cryptographic keys potentially provided by the cryptography module and to other sensitive pieces of information is controllable as a function of the check according to the specific embodiments ("security access"), e) a boot sequence (sequence of the execution of computer programs with the start of computing device 200) may be arbitrarily selected without adversely affecting the security, f) efficient and secure cryptographic functions may be provided, for example, CMAC formation, for example, based on a 128 bit AES (Advanced Encryption Standard) by using cryptography module 100, if necessary including a dedicated cryptography unit 140, g) by providing reference layouts, for example, in the form of data structure DS according to FIG. 7, it is possible to flexibly adapt the operation of cryptography module 100 to different memory layouts and to other configurations of computing device 200, h) with the transmission of first control command A1, it is possible to dynamically signal to the cryptography module the memory areas to be checked (for example, during the runtime of the cryptography module).

Further preferred specific embodiments of the present invention include a computing device 200 (FIG. 1) including at least one or for at least one cryptography module 100 according to the specific embodiments, computing device 200 being designed to transmit a first control command A1 to the at least one cryptography module 100, first control command A1 characterizing at least one memory area 310 of memory unit 300 to be checked. In this way, computing device 200 is able to advantageously communicate to cryptography module 100, in particular, dynamically, which memory area or which memory areas (if necessary, in addition to bootloader BL optionally checkable in advance) within the context of the principle of the specific embodiments is/are to be checked by cryptography module 100. The transmission of first control command A1 in further preferred specific embodiments may be carried out by bootloader BL (FIG. 5) of computing device 200. As previously mentioned, in further preferred specific embodiments, a check of bootloader BL itself or of the memory area containing it by cryptography module 100 may already take place for this purpose.

In further specific embodiments of the present invention, it is provided that computing device 200 is designed to receive a second control command A2 (FIG. 4) from the at least one cryptography module, the second control command signaling a successful check of the memory area of the memory unit to be checked, computing device 200 being designed, in particular, after receiving second control command A2, to execute at least one computer program SW2 that is associated with the memory area to be checked, which is situated, in particular, at least partially, preferably completely, in the memory area to be checked. In other words cryptography module 100 in further specific embodiments is able to transmit second control command A2 to computing device 200 after a successful check of the memory area to be checked, in order to signal the successful check.

What is claimed is:

1. A cryptography module configured to at least temporarily controlling an operation of at least one computing device, the cryptography module configured to:
hold the computing device in a reset state;
while the computing device is held in the reset state and prior to the computing device executing a bootloader and prior to the computing device executing any other computer program, check at least one memory area of a memory unit accessible by the computing device, wherein the at least one memory area of the memory control unit includes the bootloader, and the checking includes checking the bootloader using a key-based message authentication code (CMAC);
control the operation of the at least one computing device as a function of the check of the at least one memory area, including releasing the computing device from the reset state and unblocking an execution of the bootloader, only after a successful check of the bootloader, and waiting for a first control command;
receive the first control command, from the computing device, the first control command characterizing a memory area of a memory unit to be checked; and
check the memory area characterized by the first control command;
wherein in the reset state, the computing device is unable to execute any computer program; and
wherein the cryptography module includes a hardware circuit.

2. The cryptography module as recited in claim 1, wherein the cryptography module includes a memory unit integrated into the cryptography module storing at least one reference value and/or one reference layout for the at least one memory area.

3. The cryptography module as recited in claim 2, wherein the cryptography module is configured to carry out the check of the at least one memory area as a function of the reference value.

4. The cryptography module as recited in claim 1, wherein the cryptography module is configured to hold the computing device in the reset state until the check is completed.

5. The cryptography module as recited in claim 4, wherein the cryptography module is configured to establish, within the scope of the check, whether a content of the at least one memory area corresponds to a predefinable memory content, and to end the reset state for the computing device when the check has indicated that the content of the at least one memory area corresponds to the predefinable memory content, the cryptography module being configured to continue to hold the computing device in the reset state when the check has indicated that the content of the at least one memory area does not correspond to the predefinable memory content.

6. The cryptography module as recited in claim 1, wherein the at least one memory area includes at least one computer program provided for execution on the computing device.

7. The cryptography module as recited in claim 1, wherein the cryptography module is configured to provide the computing device with first data, the cryptography module being configured to provide the computing device only partially or not at all with the first data as a function of the check.

8. The cryptography module as recited in claim 7, wherein the first data include cryptographic keys.

9. The cryptography module as recited in claim 1, wherein the cryptography module is formed completely as a hardware circuit.

10. The cryptography module as recited in claim 1, wherein a system-on-a-chip (SoC) includes the cryptography module, the computing device, and the memory unit.

11. A method for operating a cryptography module for at least temporarily controlling an operation of at least one computing device, the method comprising the following steps:
   holding, by the cryptographic module, the computing device in a reset state;
   while the computing device is held in the reset state and prior to the computing device executing a bootloader and prior to the computing device executing any other computer program, checking, by the cryptography module, at least one memory area of a memory control unit, the memory unit being accessible by the computing device, wherein the at least one memory area of the memory control unit includes the bootloader, and the checking includes checking the bootloader using a key-based message authentication code (CMAC);
   controlling, by the cryptography device, the operation of the at least one computing device as a function of the check of the at least one memory area, including releasing the computing device from the reset state and unblocking an execution of the bootloader, only after a successful check of the bootloader by the cryptographic module, and waiting for a first control command;
   receiving, by the cryptography module, the first control command from the computing device, the first control command characterizing a memory area of a memory unit;
   checking, by the cryptography module, the memory area characterized by the first control command;
   wherein in the reset state, the computing device is unable to execute any computer program.

12. The method as recited in claim 11, wherein the cryptography module holds the computing device in the reset state until the check of the at least one memory area is completed.

13. The method as recited in claim 12, wherein the cryptography module establishes, within the scope of the check, whether a content of the at least one memory area corresponds to a predefinable memory content and ends the reset state for the computing device when the check has indicated that the content of the at least one memory area corresponds to the predefinable memory content, the cryptography module continuing to hold the computing device in the reset state when the check has indicated that the content of the at least one memory area does not correspond to the predefinable memory content.

14. The method as recited in claim 11, wherein a system-on-a-chip (SoC) includes the cryptography module, the computing device, and the memory unit.

15. A computing device including or for at least one cryptography module, the at least one cryptography module configured to:
   hold the computing device is a reset state;
   while the computing device is held in the reset state and prior to the computing device executing a bootloader and prior to the computing device executing any other computer program, check at least one memory area of a memory unit accessible by the computing device, wherein the at least one memory area of the memory area includes the bootloader, and the checking includes checking the bootloader using a key-based message authentication code (CMAC);
   control the operation of the at least one computing device as a function of the check of the at least one memory area including releasing the computing device from the reset state and unblocking an execution of the bootloader, only after a successful check of the bootloader, and waiting for a first control command;
   receive the first control command, from the computing device, the first control command characterizing a memory area of a memory unit to be checked; and
   check the memory area characterized by the first control command;
   wherein the computing device is configured to transmit the first control command to the at least one cryptography module;
   wherein in the reset state, the computing device is unable to execute any computer program; and
   wherein the cryptography module includes a hardware circuit.

16. The computing device as recited in claim 15, wherein the computing device is configured to receive a second control command from the at least one cryptography module, the second control command signaling a successful check of the memory area of the memory unit to be checked, the computing device being configured, after receiving the second control command, to execute at least one computer program that is associated with the memory area to be checked, which is situated at least partially in the memory area to be checked.

17. The computing device as recited in claim 15, wherein a system-on-a-chip (SoC) includes the cryptography module, the computing device, and the memory unit.

* * * * *